US012054400B2

(12) United States Patent
Oldfield et al.

(10) Patent No.: US 12,054,400 B2
(45) Date of Patent: Aug. 6, 2024

(54) METHOD FOR MAKING SULFATED POLYALUMINUM CHLORIDE (PACS) OR POLYALUMINUM CHLORIDE (PAC) AND PACS OR PAC MADE BY SAME

(71) Applicant: G2O Technologies LLC, Bound Brook, NJ (US)

(72) Inventors: Michael R. Oldfield, Benton, AR (US); Peter A. Bertasi, Gainesville, GA (US); Brian C. Reed, Benton, AR (US); Waldo Miller, Ringgold, GA (US); Keith Braud, Ringgold, GA (US)

( * ) Notice: Subject to any disclaimer, the term of this patent is extended or adjusted under 35 U.S.C. 154(b) by 0 days.

(21) Appl. No.: 15/315,426

(22) PCT Filed: Jun. 12, 2015

(86) PCT No.: PCT/US2015/035613
§ 371 (c)(1),
(2) Date: Dec. 1, 2016

(87) PCT Pub. No.: WO2015/192044
PCT Pub. Date: Dec. 17, 2015

(65) Prior Publication Data
US 2017/0113943 A1    Apr. 27, 2017

Related U.S. Application Data

(60) Provisional application No. 62/025,256, filed on Jul. 16, 2014, provisional application No. 62/011,999, filed on Jun. 13, 2014.

(51) Int. Cl.
C01F 7/786   (2022.01)
C01F 7/00    (2022.01)
C02F 1/52    (2023.01)

(52) U.S. Cl.
CPC .............. C01F 7/786 (2022.01); C01F 7/00 (2013.01); C02F 1/5245 (2013.01)

(58) Field of Classification Search
CPC ............................ C01F 7/007; C02F 1/5245
(Continued)

(56) References Cited

U.S. PATENT DOCUMENTS 2,798,049 A    7/1957   White et al.
4,826,606 A    5/1989   Becker et al.
(Continued)

FOREIGN PATENT DOCUMENTS

EP    0769473 B1    1/2000
JP    54-032197 A   3/1979
(Continued)

OTHER PUBLICATIONS

PCT, International Search Report and Written Opinion, International Application No. PCT/US2015/035613, 15 pages, Sep. 4, 2015.
(Continued)

*Primary Examiner* — Anita Nassiri-Motlagh
(74) *Attorney, Agent, or Firm* — BURNS & LEVINSON LLP

(57) ABSTRACT

Methods for making a sulfated polyaluminum chloride (PACS) flocculating agent solution, which may be aqueous, include neutralizing an aqueous sulfate-containing aluminum compound with an aqueous base to produce an aluminum hydroxide precipitate dispersed in a liquid, settling the aluminum hydroxide precipitate to create a supernatant liquid, removing an amount of the supernatant liquid to leave a remainder that contributes a selected concentration of sulfate to the PACS, and bringing the precipitate back into solution thereby forming the PACS flocculating agent. Also, methods for making a polyaluminum chloride (PAC) floc- (Continued)

culating agent solution are disclosed that include neutralizing an aqueous chloride-containing aluminum compound with an aqueous base to produce an aluminum hydroxide precipitate dispersed in a liquid, settling the aluminum hydroxide precipitate to create a supernatant liquid, optionally, removing an amount of the supernatant liquid, and bringing the precipitate back into solution thereby forming the PAC flocculating agent.

20 Claims, 3 Drawing Sheets

(58) Field of Classification Search
USPC .......................................................... 423/467
See application file for complete search history.

(56) References Cited

U.S. PATENT DOCUMENTS

| | | | |
|---|---|---|---|
| 5,879,651 A * | 3/1999 | Dufour | C01F 7/002 |
| | | | 210/723 |
| 5,985,234 A | 11/1999 | Dulko | |
| 5,997,838 A | 12/1999 | Dulko | |
| 6,036,935 A | 3/2000 | Dulko | |
| 6,537,464 B1 | 3/2003 | Shultes, III et al. | |
| 2009/0176118 A1* | 7/2009 | Ishikawa | C01F 7/0653 |
| | | | 428/540 |
| 2010/0061919 A1 | 3/2010 | Grove et al. | |

FOREIGN PATENT DOCUMENTS

| | | |
|---|---|---|
| JP | H07-172824 A | 7/1995 |
| KR | 20050005111 A | 1/2005 |
| KR | 20060029130 A | 4/2006 |
| KR | 20080046364 A | 5/2008 |

OTHER PUBLICATIONS

Canadian Intellectual Property Office, Examination Report, Canadian Patent Application No. 2,950,328, 3 pages, Jun. 21, 2021.

* cited by examiner

| Aluminum compound (pptn) | Base Source (pptn) | Al compound (digestion) | Al compound (pptn) (g) | Base Source (pptn) (g) | Initial water (bulk) (g) | Base dilution H2O (g) | Supernatant removed (g) | Al compound (digestion) (g) | Final Product (g) | Final Product Alumina content (%Al2O3) | Final Product Basicity (%) |
|---|---|---|---|---|---|---|---|---|---|---|---|
| Alum | NaOH (50%) | ACS | 174 | 67 | 150 | 83 | 0 | 563 | 1037 | 7 - 9% | 20 - 25% |
| Alum | NaOH (50%) | ACS | 253 | 97 | 150 | 89 | 352 | 763 | 1000 | 10 - 12% | 20 - 25% |
| Alum | NaOH (50%) | ACS | 370 | 142 | 150 | 200 | 0 | 138 | 1000 | 4 - 6% | 65 - 70% |
| Alum | NaOH (50%) | ACS | 773 | 296 | 150 | 581 | 1087 | 287 | 1000 | 9 - 11% | 65 - 70% |
| Alum | NaOH (50%) | ACS | 397 | 152 | 150 | 226 | 0 | 75 | 1000 | 4 - 6% | 75 - 80% |
| Alum | NaOH (50%) | ACS | 893 | 343 | 150 | 692 | 1247 | 169 | 1000 | 9 - 11% | 75 - 80% |
| Alum | NaOH (50%) | PAC | 141 | 54 | 150 | 231 | 0 | 424 | 1000 | 8 - 10% | 50 - 55% |
| Alum | NaOH (50%) | PAC | 254 | 97 | 150 | 90 | 350 | 759 | 1000 | 15 - 17% | 50 - 55% |
| Alum | NaOH (50%) | PAC | 339 | 130 | 150 | 167 | 0 | 214 | 1000 | 6 - 8% | 65 - 70% |
| Alum | NaOH (50%) | PAC | 640 | 246 | 150 | 454 | 895 | 405 | 1000 | 12 - 14% | 65 - 70% |
| Alum | NaOH (50%) | PAC | 387 | 149 | 150 | 216 | 0 | 98 | 1000 | 5 - 7% | 75 - 80% |
| Alum | NaOH (50%) | PAC | 844 | 324 | 150 | 648 | 1179 | 213 | 1000 | 10 - 12% | 75 - 80% |
| Alum | SodAl (38%) | ACS | 63 | 51 | 150 | 171 | 0 | 565 | 1000 | 7 - 9% | 20 - 25% |
| Alum | SodAl (38%) | ACS | 85 | 68 | 150 | 287 | 354 | 764 | 1000 | 10 - 12% | 20 - 25% |
| Alum | SodAl (38%) | ACS | 125 | 100 | 150 | 487 | 0 | 138 | 1000 | 4 - 6% | 65 - 70% |
| Alum | SodAl (38%) | ACS | 257 | 208 | 150 | 1175 | 1076 | 286 | 1000 | 9 - 11% | 65 - 70% |
| Alum | SodAl (38%) | ACS | 134 | 107 | 150 | 534 | 0 | 75 | 1000 | 4 - 6% | 75 - 80% |
| Alum | SodAl (38%) | ACS | 301 | 242 | 150 | 1387 | 1249 | 169 | 1000 | 9 - 11% | 75 - 80% |
| Alum | SodAl (38%) | PAC | 48 | 38 | 150 | 340 | 0 | 424 | 1000 | 8 - 10% | 50 - 55% |
| Alum | SodAl (38%) | PAC | 86 | 69 | 150 | 287 | 355 | 763 | 1000 | 15 - 17% | 50 - 55% |
| Alum | SodAl (38%) | PAC | 114 | 91 | 150 | 431 | 0 | 214 | 1000 | 6 - 8% | 65 - 70% |
| Alum | SodAl (38%) | PAC | 215 | 173 | 150 | 952 | 895 | 405 | 1000 | 12 - 14% | 65 - 70% |
| Alum | SodAl (38%) | PAC | 130 | 105 | 150 | 517 | 0 | 98 | 1000 | 5 - 7% | 75 - 80% |
| Alum | SodAl (38%) | PAC | 284 | 228 | 150 | 1304 | 1179 | 213 | 1000 | 10 - 12% | 75 - 80% |

Low % Al2O3 Example
High %Al2O3 Example

PAC = Polyaluminum Chloride Solution at 17% Al2O3 and 42% Basicity
ACS = Aluminum Chloride solution at 10.8% Al2O3
Alum = Aluminum Sulfate Solution at 8.15% Al2O3
SodAl (38%) = Sodium Aluminate 38% Solution at 20% Al2O3 and 18.5% Na2O
341950.1

FIG. 1

| Aluminum compound (pptn) | Base Source (pptn) | Al compound (digestion) | Al compound (pptn) (g) | Base Source (pptn) (g) | Initial water (bulk) (g) | Base dilution H2O (g) | Supernatant removed (g) | Al compound (digestion) (g) | Final Product (g) | Final Product Alumina content (%Al2O3) | Final Product Basicity (%) |
|---|---|---|---|---|---|---|---|---|---|---|---|
| ACS | NaOH (50%) | ACS | 141 | 72 | 150 | 74 | 0 | 563 | 1000 | 7 - 9% | 20 - 25% |
| ACS | NaOH (50%) | ACS | 191 | 97 | 150 | 151 | 352 | 763 | 1000 | 10 - 12% | 20 - 25% |
| ACS | NaOH (50%) | ACS | 279 | 142 | 150 | 291 | 0 | 138 | 1000 | 4 - 6% | 65 - 70% |
| ACS | NaOH (50%) | ACS | 579 | 295 | 150 | 764 | 1073 | 285 | 1000 | 9 - 11% | 65 - 70% |
| ACS | NaOH (50%) | ACS | 296 | 151 | 150 | 329 | 0 | 74 | 1000 | 4 - 6% | 75 - 80% |
| ACS | NaOH (50%) | ACS | 674 | 343 | 150 | 913 | 1249 | 169 | 1000 | 9 - 11% | 75 - 80% |
| ACS | NaOH (50%) | PAC | 141 | 72 | 150 | 74 | 0 | 563 | 1000 | 11 - 13% | 50 - 55% |
| ACS | NaOH (50%) | PAC | 191 | 97 | 150 | 151 | 352 | 763 | 1000 | 15 - 17% | 50 - 55% |
| ACS | NaOH (50%) | PAC | 255 | 130 | 150 | 251 | 0 | 214 | 1000 | 6 - 8% | 65 - 70% |
| ACS | NaOH (50%) | PAC | 482 | 245 | 150 | 611 | 892 | 404 | 1000 | 12 - 14% | 65 - 70% |
| ACS | NaOH (50%) | PAC | 296 | 151 | 150 | 304 | 0 | 99 | 1000 | 5 - 7% | 75 - 80% |
| ACS | NaOH (50%) | PAC | 637 | 324 | 150 | 855 | 1179 | 213 | 1000 | 10 - 12% | 75 - 80% |
| PAC | NaOH (50%) | ACS | 90 | 42 | 150 | 155 | 0 | 563 | 1000 | 7 - 9% | 20 - 25% |
| PAC | NaOH (50%) | ACS | 121 | 56 | 150 | 262 | 352 | 763 | 1000 | 10 - 12% | 20 - 25% |
| PAC | NaOH (50%) | ACS | 177 | 82 | 150 | 454 | 0 | 137 | 1000 | 4 - 6% | 65 - 70% |
| PAC | NaOH (50%) | ACS | 367 | 171 | 150 | 1096 | 1069 | 285 | 1000 | 9 - 11% | 65 - 70% |
| PAC | NaOH (50%) | ACS | 188 | 87 | 150 | 501 | 0 | 74 | 1000 | 4 - 6% | 75 - 80% |
| PAC | NaOH (50%) | ACS | 428 | 199 | 150 | 1303 | 1249 | 169 | 1000 | 9 - 11% | 75 - 80% |
| PAC | NaOH (50%) | PAC | 90 | 42 | 150 | 155 | 0 | 563 | 1000 | 11 - 13% | 50 - 55% |
| PAC | NaOH (50%) | PAC | 121 | 56 | 150 | 264 | 350 | 759 | 1000 | 15 - 17% | 50 - 55% |
| PAC | NaOH (50%) | PAC | 162 | 75 | 150 | 399 | 0 | 214 | 1000 | 6 - 8% | 65 - 70% |
| PAC | NaOH (50%) | PAC | 307 | 142 | 150 | 891 | 895 | 405 | 1000 | 12 - 14% | 65 - 70% |
| PAC | NaOH (50%) | PAC | 186 | 86 | 150 | 480 | 0 | 98 | 1000 | 5 - 7% | 75 - 80% |
| PAC | NaOH (50%) | PAC | 405 | 188 | 150 | 1223 | 1179 | 213 | 1000 | 10 - 12% | 75 - 80% |

PAC = Polyaluminum Chloride Solution at 17% Al$_2$O$_3$ and 42% Basicity  Low % Al$_2$O$_3$
ACS = Aluminum Chloride solution at 10.8% Al$_2$O$_3$   High %Al$_2$O$_3$
SodAl (38%) = Sodium Aluminate 38% Solution at 20% Al$_2$O$_3$ and 18.5% Na$_2$O
341951.1

FIG. 2

| Aluminum compound (pptn) | Base Source (pptn) | Al compound (digestion) | Al compound (pptn) (g) | Base Source (pptn) (g) | Initial water (bulk) (g) | Base dilution H2O (g) | Supernatant removed (g) | Al compound (digestion) (g) | Final Product (g) | Final Product Alumina content (%Al2O3) | Final Product Basicity (%) |
|---|---|---|---|---|---|---|---|---|---|---|---|
| ACS | SodAl (38%) | ACS | 47 | 51 | 150 | 187 | 0 | 565 | 1000 | 7 - 9% | 20 - 25% |
| ACS | SodAl (38%) | ACS | 64 | 68 | 150 | 307 | 352 | 763 | 1000 | 10 - 12% | 20 - 25% |
| ACS | SodAl (38%) | ACS | 94 | 100 | 150 | 518 | 0 | 138 | 1000 | 4 - 6% | 65 - 70% |
| ACS | SodAl (38%) | ACS | 196 | 209 | 150 | 1245 | 1087 | 287 | 1000 | 9 - 11% | 65 - 70% |
| ACS | SodAl (38%) | ACS | 101 | 107 | 150 | 567 | 0 | 75 | 1000 | 4 - 6% | 75 - 80% |
| ACS | SodAl (38%) | ACS | 227 | 242 | 150 | 1459 | 1247 | 169 | 1000 | 9 - 11% | 75 - 80% |
| ACS | SodAl (38%) | PAC | 47 | 51 | 150 | 187 | 0 | 565 | 1000 | 11 - 13% | 50 - 55% |
| ACS | SodAl (38%) | PAC | 65 | 69 | 150 | 308 | 355 | 763 | 1000 | 15 - 17% | 50 - 55% |
| ACS | SodAl (38%) | PAC | 86 | 91 | 150 | 459 | 0 | 214 | 1000 | 6 - 8% | 65 - 70% |
| ACS | SodAl (38%) | PAC | 162 | 173 | 150 | 1004 | 894 | 405 | 1000 | 12 - 14% | 65 - 70% |
| ACS | SodAl (38%) | PAC | 98 | 105 | 150 | 549 | 0 | 98 | 1000 | 5 - 7% | 75 - 80% |
| ACS | SodAl (38%) | PAC | 214 | 228 | 150 | 1374 | 1179 | 213 | 1000 | 10 - 12% | 75 - 80% |
| PAC | SodAl (38%) | ACS | 42 | 41 | 150 | 202 | 0 | 565 | 1000 | 7 - 9% | 20 - 25% |
| PAC | SodAl (38%) | ACS | 57 | 55 | 150 | 328 | 354 | 764 | 1000 | 10 - 12% | 20 - 25% |
| PAC | SodAl (38%) | ACS | 83 | 81 | 150 | 548 | 0 | 138 | 1000 | 4 - 6% | 65 - 70% |
| PAC | SodAl (38%) | ACS | 172 | 167 | 150 | 1301 | 1076 | 286 | 1000 | 9 - 11% | 65 - 70% |
| PAC | SodAl (38%) | ACS | 89 | 86 | 150 | 600 | 0 | 75 | 1000 | 4 - 6% | 75 - 80% |
| PAC | SodAl (38%) | ACS | 200 | 194 | 150 | 1536 | 1249 | 169 | 1000 | 9 - 11% | 75 - 80% |
| PAC | SodAl (38%) | PAC | 42 | 41 | 150 | 204 | 0 | 563 | 1000 | 11 - 13% | 50 - 55% |
| PAC | SodAl (38%) | PAC | 57 | 55 | 150 | 330 | 355 | 763 | 1000 | 15 - 17% | 50 - 55% |
| PAC | SodAl (38%) | PAC | 76 | 73 | 150 | 487 | 0 | 214 | 1000 | 6 - 8% | 65 - 70% |
| PAC | SodAl (38%) | PAC | 143 | 139 | 150 | 1057 | 894 | 405 | 1000 | 12 - 14% | 65 - 70% |
| PAC | SodAl (38%) | PAC | 87 | 84 | 150 | 581 | 0 | 98 | 1000 | 5 - 7% | 75 - 80% |
| PAC | SodAl (38%) | PAC | 189 | 183 | 150 | 1444 | 1179 | 213 | 1000 | 10 - 12% | 75 - 80% |

PAC = Polyaluminum Chloride Solution at 17% Al₂O₃ and 42% Basicity  
ACS = Aluminum Chloride solution at 10.8% Al₂O₃  
SodAl (38%) = Sodium Aluminate 38% Solution at 20% Al₂O₃ and 18.5% Na₂O Low % Al₂O₃
High % Al₂O₃

FIG. 3

METHOD FOR MAKING SULFATED POLYALUMINUM CHLORIDE (PACS) OR POLYALUMINUM CHLORIDE (PAC) AND PACS OR PAC MADE BY SAME

FIELD OF THE INVENTION

The present invention relates generally to methods for making polyaluminum chloride, sulfated polyaluminum chloride, and polyaluminum chlorosulfate from methods involving the precipitations of an aluminum hydroxide and thereafter bringing the precipitate back into solution.

BACKGROUND OF THE INVENTION

Polyaluminum chloride (PAC) is useful as flocculating agents for water treatment. When added to water containing impurities and unwanted particles, it combines with the impurities and particles to produce a floc that settles out of solution, thereby removing the impurities and particles from the water. PACs can offer a number of advantages over traditional coagulants such as alum or iron salts. Because PACs are typically pre-neutralized and have a higher charge density than traditional coagulants, they coagulate via a more efficient mechanism, called charge neutralization. This allows PACs to be effective at lower doses than alum or iron salts, when one compares the actual metal being added by the coagulant to the system.

PAC is not a single product, but an entire spectrum of versatile inorganic polymers. PACs are characterized by two primary numbers: their strength (usually in % alumina, or $Al_2O_3$), and their basicity. The percent alumina is a percent weight/weight value (% w/w), which means the number of kilograms of active chemical per 100 kilograms of liquid chemical. For example, if liquid alum is 7.5% w/w alumina, it has 7.5 kg of $Al_2O_3$ in solution for every 100 kilograms of liquid chemical delivered.

Basicity gives a quantitative measure of how many hydroxyl ions are included in the structure of the PAC. The higher the basicity of a coagulant such as a PAC, the lower the impact the coagulant will have on dosed water pH. At the low end of the basicity scale is aluminum chloride solution (ACS), with 0% basicity (which means it is not a PAC). Alumina is a surrogate measurement parameter for the actual polyaluminum chloride and polyaluminum chlorosulfate compounds. These can also be represented by empirical formulas like $Al_2(OH)_xCl_{6-x} \cdot nH_2O$; where x=(6x % basicity)/100 and n is the typically between 1-6 or $Al_2(OH)_xCl_y(SO_4)_z \cdot nH_2O$; where x=(6-y-2z) and n is the again typically between 1-6. These types of compounds along with any residual salts compromise the solids present in the products and water makes up the balance. The solids contributed by the PAC or PACS can be estimated by multiply the % alumina by the molecular weight ratio of the empirical formula compound with the molecular weight of alumina. For example a PAC with 10% alumina, 67% Basicity and 6 waters of hydration would have the empirical formula $Al_2(OH)_4Cl_2 \cdot 6H_2O$ and a molecular weight of 300.989 whereas the molecular weight of alumina is 101.961. The percent solids of the PAC would be estimated as follows; 8%×300.989/101.961=23.6%. The lowest basicity commercial PACs are about 10%; most PACs are in the medium to high basicity range (50-70%). At the top of the scale is aluminum chlorohydrate (ACH). At 83%, ACH is the highest stable basicity PAC available. The introduction of sulfate into the PAC to form a polyaluminum chlorosulfate, or PACS, enhances the ability to combine with the impurities and particles, thereby further improving the removal of impurities and particles from the water.

Complex methods of making PAC and PACS are disclosed in the patent literature, including methods using high amounts of aluminum metal or aluminum chlorohydrate as a starting material, high shear mixing to avoid gel formation, which requires special more expensive equipment, and/or addition of sulfuric acid.

It is always desirable to develop lower cost manufacturing processes using less expensive equipment and readily available starting materials.

SUMMARY OF INVENTION

The methods disclosed herein utilize less expensive and more conventional equipment and readily available starting materials to create PAC and PACS products, and the methods do so by formation of a precipitate that does not need to be filtered to a cake or dry powder.

When no filtering to a cake or dry powder is utilized, the methods for making a PACS flocculating agent solution, which may be aqueous, include mixing a sulfate-containing aluminum compound with a base to produce an aluminum hydroxide precipitate dispersed in a liquid, settling the aluminum hydroxide precipitate to create a supernatant liquid, removing an amount of the supernatant liquid to form a slurry and/or leave a remainder of supernatant liquid that contributes a selected concentration of sulfate to the PACS, and adding a low- to mid-basicity polyaluminum chloride solution, an aluminum chloride solution, a hydrochloric acid solution, or a combination thereof to the aluminum hydroxide precipitate to bring the precipitate back into solution thereby forming the PACS flocculating agent. The method may also include heating to reduce the time for bringing the precipitate back into solution, dispersing the precipitate into the remaining supernatant liquid, and/or maintaining the pH in the range of 4.5-10 or more preferably 4.5 to 7.5 during the mixing.

In one embodiment, mixing the sulfate-containing aluminum compound with the base includes maintaining the reaction temperature at or above 40° C., or more preferably at or above 50° C.

In one embodiment, alum, aluminum sulfate, and/or sulfated polyaluminum chloride is the source of the sulfate-containing aluminum compound, the base is one or more of sodium carbonate, sodium bicarbonate, sodium hydroxide, and sodium aluminate, and a low- to mid-basicity polyaluminum chloride or aluminum chloride is added to bring the precipitate back into solution. The aqueous sulfated polyaluminum chloride may have about 10% to about 16% w/w alumina, about 4% to about 6% w/w sulfate, and a basicity of about 40% to about 70%. In another embodiment, the aqueous sulfated polyaluminum chloride has about 10% to about 11% w/w alumina, about 4.5% to about 5.5% w/w sulfate, and has a basicity of about 65% to about 69%. In another embodiment, the aqueous sulfate-containing aluminum compound comprises an aluminum sulfate having about 2% to about 8% w/w alumina.

The aqueous low- to mid-basicity polyaluminum chloride may include about 10% to about 18% w/w alumina and has a basicity of about 20% to about 45%. In one embodiment, a mid-basicity polyaluminum chloride is added to bring the precipitate back into solution. The mid-basicity polyaluminum chloride may include about 16.5% to about 17.5% w/w alumina and a basicity of about 40% to 44%. In another embodiment, it is aqueous aluminum chloride that is added and the aluminium chloride has about 2% to about 10% w/w alumina.

In one embodiment, the base may be aqueous sodium hydroxide having 1% to 50% w/w sodium hydroxide. In another embodiment, the base may be sodium aluminate having about 20% to about 25% w/w alumina and about 18% to about 20% w/w sodium dioxide. In another embodiment, the base may be aqueous sodium carbonate having 1% to about 33% w/w sodium carbonate. When the base is sodium aluminate, the flow rates of the sulfate-containing aluminum compound and the sodium aluminate into the mixing step are substantially equal.

In one aspect, the content and/or properties of the PACS is tailored by adding other compounds to the solution. In one embodiment, aluminum chloride, polyaluminum chloride, aluminum chlorohydrate, or a combination thereof, in a dry or aqueous state, is added simultaneously in the adding step or subsequent thereto.

The final product, the PACS flocculating agent solution, may include about 10% to about 16% w/w alumina about 4% to about 6% w/w sulfate and have a basicity of about 40% to about 70%. In one embodiment, the PACS flocculating agent solution includes about 10% to about 11% w/w alumina, about 4.5% to about 5.5% w/w sulfate, and have a basicity of about 65% to about 69%. In another embodiment, the PACS flocculating agent solution includes about 12% to about 13% w/w alumina, about 3.5% to about 4.5% sulfate, and have a basicity of about 64% to about 68%.

In another aspect, PACS flocculants are made according to the methods disclosed herein. In one embodiment, the sulfated polyaluminum chloride as a final product comprises about 10% to about 16% w/w alumina, about 4% to about 6% w/w sulfate, and has a basicity of about 40% to about 70%. In another embodiment, the sulfated polyaluminum chloride as a final product comprises about 10% to about 11% w/w alumina, about 4.5% to about 5.5% w/w sulfate, and has a basicity of about 65% to about 69%.

In a third aspect, methods for making a PAC flocculating agent solution, which may be aqueous, are disclosed. The methods include mixing a chloride-containing aluminum compound with a base to produce an aluminum hydroxide precipitate dispersed in a liquid, adding a low- to mid-basicity polyaluminum chloride solution, an aluminum chloride solution, a hydrochloric acid solution, or a combination thereof to the aluminum hydroxide precipitate to bring the precipitate back into solution, thereby forming the PAC flocculating agent. The method may also include settling the aluminum hydroxide precipitate to create a supernatant liquid, removing an amount of the supernatant liquid to form a slurry and/or leave a remainder of supernatant liquid, heating to reduce the time for bringing the precipitate back into solution, dispersing the precipitate into the remaining supernatant liquid, and/or maintaining the pH in the range of 4.5-10 or more preferably 4.5 to 7.5 during the mixing.

Heating to reduce the time for bringing the precipitate back into solution includes heating to a temperature in a range of about 30° C. to about 90° C., or more preferably in a range of about 49° C. to about 71° C. Additionally, heat may be controlled during the mixing of the chloride-containing aluminum compound with the base, for example, at a reaction temperature at or above 40° C., or more preferably at or above 50° C. The mixing includes introducing the chloride-containing aluminum compound and the base into a reaction vessel, each at a flow rate. In one embodiment, the flow rate of the chloride-containing aluminum compound is greater than the flow rate of the base. In another embodiment, the flow rates of the chloride-containing aluminum compound and the base are substantially equal.

In one aspect of the method, at least one of aqueous aluminum chloride and aqueous polyaluminum chloride is the source of the chloride-containing aluminum compound, and the aqueous base is one or more of sodium aluminate and aqueous sodium hydroxide. The aqueous base may be aqueous sodium hydroxide having about 1% to about 50% w/w sodium hydroxide, or aqueous sodium aluminate having about 20% to about 25% w/w alumina and about 18% to about 20% w/w sodium dioxide. In another embodiment, the low- to mid-basicity polyaluminum chloride comprises about 10% to about 18% w/w alumina and has a basicity of about 20% to about 45%.

Then, subsequent to the settling of the precipitate, the adding phase to bring the precipitate back into solution may include the addition of a low- to mid-basicity polyaluminum chloride aqueous solution simultaneously or subsequent to adding aluminum chloride, polyaluminum chloride, aluminum chlorohydrate or a combination thereof in a dry or aqueous state. In one embodiment, aqueous aluminum chloride is added that comprises about 2% to about 10% w/w alumina. In another embodiment, the aqueous chloride-containing aluminum compound is aqueous polyaluminum chloride having about 8% to about 13% w/w alumina and a basicity of about 60% to about 70%.

BRIEF DESCRIPTION OF THE DRAWINGS

FIG. 1 is a chart of trials according to the methods to make PACS disclosed herein showing the source of the sulfate-containing, the base added thereto, the aluminum compound used to bring the precipitate back into solution, and the alumina content and basicity range of the PACS product resulting therefrom.

FIG. 2 is a chart of trials according to the methods to make PAC disclosed herein showing the source of the chloride-containing compound, sodium hydroxide as the base added thereto, the aluminum compound used to bring the precipitate back into solution, and the alumina content and basicity range of the PAC product resulting therefrom.

FIG. 3 is a chart of trials according to the methods to make PAC disclosed herein showing the source of the chloride-containing compound, sodium aluminate as the base added thereto, the aluminum compound used to bring the precipitate back into solution, and the alumina content and basicity range of the PAC product resulting therefrom.

DETAILED DESCRIPTION OF INVENTION

Methods for making sulfated polyaluminum chloride (PACS) flocculating agents are described herein. As used herein flocculating agents should be construed broadly to include coagulants and other such agents suitable for removing impurities and particles from water. In one embodiment when making PACS, such a method begins by neutralizing, with conventional agitation and/or mixing, a sulfate-containing aluminum compound with a base to produce an aluminum hydroxide precipitate dispersed in a liquid. These neutralization reactions, when aluminum sulfate is the sulfate-containing aluminum compound with various bases, include, but are not limited to:

$$Al_2(SO_4)_3(aq)+6Na_2CO_3(aq) \rightarrow 3Na_2SO_4(aq)+2Al(OH)_3(s)+6CO_2(g). \quad (I)$$

$$Al_2(SO_4)_3(aq)+6NaOH(aq) \rightarrow 3Na_2SO_4(aq)+2Al(OH)_3(s). \quad (II)$$

$$Al_2(SO_4)_3(aq)+6NaHCO_3(aq)\rightarrow 3Na_2SO_4(aq)+2Al(OH)_3(s)+6CO_2(g). \quad (III)$$

$$Al_2(SO_4)_3(aq)+3Na_2Al_2O_4(aq)+12H_2O(aq)\rightarrow 3Na_2SO_4(aq)+4Al(OH)_3(s). \quad (IV)$$

$$Al_2(SO_4)_3(aq)+6NaAl(OH)_4(aq)\rightarrow 3Na_2SO_4(aq)+8Al(OH)_3(s). \quad (V)$$

Additionally, methods for making polyaluminum chloride (PAC) flocculating agents are described herein. As used herein flocculating agents should be construed broadly to include coagulants and other such agents suitable for removing impurities and particles from water. In one embodiment when making PAC, such a method begins by neutralizing, with conventional agitation and/or mixing, a chloride-containing aluminum compound with an aqueous base, such as sodium aluminate or sodium hydroxide, to produce an aluminum hydroxide precipitate dispersed in a liquid. These neutralization reactions, when polyaluminum chloride is the chloride-containing aluminum compound with sodium aluminate containing excess sodium hydroxide, include, but are not limited to:

$$Al_2(OH)_xCl_{6-x}(aq)+(6-x)Na_2Al_2O_4(aq)+4x(6-x)H_2O(aq)\rightarrow (6-x)Na_2SO_4(aq)+(8-x)Al(OH)_3(s). \quad (VI)$$

$$Al_2(OH)_xCl_{6-x}(aq)+(6-x)NaAl(OH)_4(aq)\rightarrow (6-x)Na_2SO_4(aq)+(8-x)Al(OH)_3(s). \quad (VII)$$

$$Al_2(OH)_xCl_{6-x}(aq)+(6-x)NaOH(aq)\rightarrow (6-x)Na_2SO_4(aq)+2Al(OH)_3(s). \quad (VIII)$$

Where $Al_2(OH)_xCl_{6-x}$ is the empirical formula for PAC and $x=(6x\%\ basicity)/100$.

For the method of making PAC, the neutralization occurs under ambient temperature and pressure in a reaction vessel that is open or at least vented to the atmosphere. The reaction vessel typically contains water, preferably purified water, to which the aluminum compound and the base are added, typically as aqueous solutions. During the course of the reaction(s), the reaction temperature may fluctuate and increase, but is preferably at least at 40° C., more preferably at least 45° C., and most preferably at least 50° C., even at the beginning of the reaction, which can be accomplished by using water at such a temperature in the reaction vessel. In one embodiment the temperature during neutralization is in a range of about 30° C. to about 90° C., 100° C., or a temperature that does not cause evaporation and/or degradation of the reactants to become significant, whichever is lower. In another embodiment, the temperature during neutralization is in a range of about 40° C. to about 55° C.

The base may be sodium carbonate, sodium bicarbonate, sodium hydroxide, sodium aluminate, and combinations thereof. In one embodiment, the base is sodium aluminate, which may contain an excess of sodium hydroxide alum. In another embodiment, the sodium aluminate may contain about 20% to about 25% w/w alumina and about 18% to about 20% w/w sodium dioxide. In one embodiment, the sodium aluminate contains about 18% w/w disodium oxide and about 20% w/w alumina. In another embodiment, the base is aqueous sodium hydroxide having about 1% to about 50% w/w sodium hydroxide.

At least one of aqueous alum, aqueous aluminum sulfate, or aqueous sulfated polyaluminum chloride may be the source of the sulfate-containing aluminum compound for the method of making PACS. In one embodiment, at least aqueous sulfated polyaluminum chloride is the source of the sulfate-containing aluminum compound and it has about 10% to about 16% w/w alumina, about 4% to about 6% w/w sulfate, and a basicity of about 40% to about 70%. In another embodiment, at least aqueous sulfated polyaluminum chloride is the source of the sulfate-containing aluminum compound and it comprises about 10% to about 11% w/w alumina, about 4.5% to about 5.5% w/w sulfate, and has a basicity of about 65% to about 69%. In other embodiments, the aqueous sulfated polyaluminum chloride may have (i) about 8% to about 13% w/w alumina, about 2% to about 6% w/w sulfate, and a basicity of about 60% to about 70%; or (ii) about 12.0% to about 12.5% w/w alumina, about 3.5% to about 3.6% w/w sulfate, and has a basicity of about 65% to about 67%. In another embodiment, the aqueous sulfate-containing aluminum compound comprises an aluminum sulfate having about 2% to about 8% w/w alumina.

For the methods of making PAC, the chloride-containing aluminum compound may be an aqueous compound such as polyaluminum chloride having alumina in an amount up to 24% w/w and a basicity of up to 83% or polyaluminum chloride having about 12.0% to about 12.5% w/w alumina and a basicity of about 65% to about 67%.

For the methods of making PAC, additional examples of chloride-containing aluminum compounds that were added as aqueous solution and examples of the base are found in FIGS. 2 and 3.

Both reactants used in either method are typically added simultaneously at a substantially constant feed rate and a substantially constant ratio between the two reactants under controlled feed, temperature, and pH conditions. For PACS, the sulfate-containing aluminum compound and the base are typically added simultaneously into a reaction vessel with either the sulfate-containing aluminum compound at a flow rate greater than the flow rate of the base, or at substantially equal flow rates. For PAC, the chloride-containing aluminum compound and the base are typically added simultaneously into a reaction vessel with either the sulfate-containing aluminum compound at a flow rate greater than the flow rate of the base, or at substantially equal flow rates. The feed rate of each of these reactants is selected to control the pH of the reaction such that the initial pH in the reaction vessel, once the addition of the reactants has begun, is preferably within a range of about 5 to about 6 for about 5 to 40 minutes, more preferably about 5 to 10 minutes, and subsequently is maintained at a pH of about 6.5 to about 7.5. In another embodiment, the pH is maintained at about 6.8 to about 7.2.

For the methods of making PACS, in one embodiment, when aluminum sulfate and aqueous sodium carbonate are the reactants, the ratio between the two reactants may be such that the feed rate (or flow rate) of the sulfate-containing aluminum compound is about 1% to about 4% in excess of the feed rate of the base. For example, when the feed rate of the base is 30 gpm, the feed rate of the sulfate-containing aluminum compound is 1% in excess thereof, or 30.3 gpm, and when the feed rate of the base is 60 gpm, the feed rate of the sulfate-containing aluminum compound is 4% in excess thereof, or about 62.4 gpm. In another embodiment, a soda ash solution, the base, is pumped into the reaction vessel at a feed rate of 50 gpm and an aqueous aluminum sulfate solution is pumped into the reaction vessel at a feed rate of 51 gpm, which is 2% in excess of the feed rate for the soda ash solution. As used herein "substantially constant" means a feed rate that falls within ±1 to 5 gallons per minute of the selected gallons per minute. The feed rate of each of these reactants is selected to control the pH of the reaction such that the initial pH in the reaction vessel, once the addition of the reactants has begun, is preferably within a range of about 3.2 to about 4.0 for about 15 to 40 minutes, more preferably about 20 to 30 minutes, and subsequently reaches a final pH of about 4.5 to about 10. While this example provided the sulfate-containing aluminum compound and the base as aqueous solutions, in other embodiments, one or both of the reactants may be introduced into water as a solid.

For the method of making PACS, the temperature during neutralization may fluctuate but is preferably at least 40° C., more preferably at least 45° C., and most preferably at least 50° C. This is accomplished by heating the water used during neutralization. In one embodiment, the temperature during neutralization is in a range of about 30° C. to about 90° C., 100° C., or a temperature that does not cause evaporation and/or degradation of the reactants to become significant, whichever is lower. In another embodiment, the temperature during neutralization is in a range of about 40° C. to about 55° C.

For the method of making PACS, when utilizing sodium carbonate as the base, an aqueous solution of sodium carbonate is made by dissolving solid sodium carbonate in water. The dissolution process is exothermic and generates heat but is assisted by heating the water used to at least 40° C. to about 60° C. Along with the exothermic dissolution process this heats the aqueous sodium carbonate solution to about 55° C. to about 75° C. Using the aqueous solution of sodium carbonate at these temperatures assists in keeping the neutralization reaction at a temperature of at least 40° C. more preferably at least 45° C. and most preferably at least 50° C.

As used herein "conventional agitation and mixing" means intermingling of liquid materials by a mechanical, hydraulic or air sparge system that is standard to the chemical manufacturing industry for intermingling liquid raw materials without regard to the actual energy input into the system. Conventional agitating and mixing includes other suitable mixing means know in the industry, but does not include mixing means that create a level of shear that is high enough to prevent precipitate formation and/or to prevent the precipitate from settling out of solution, for example because the mixing results in smaller particle size. For similar reasons, use of a mixing means that creates a level of sheer that is high enough to interfere with precipitate formation and/or the ability of the precipitate to settle out of solution will result in a less preferred embodiment.

The neutralization is typically allowed to continue over a period of 1 to 6 hours, or more preferably about 2 to 3 hours with the mixing and/or agitation. For a shorter neutralization period, a defoamer is added to break meta-stable foams created by the release of the carbon dioxide gas which limits the rate of neutralization due to expansion of the bulk volume of the mixture to greater than that of the reaction vessel. Suitable defoamers include, but are not limited to, simethicone, polydimethyl siloxanes, octamethylcyclotetrasiloxane, and combinations thereof. In one embodiment, when the defoamer is added, neutralization is completed within a period of 1 to 4 hours, or more preferably 2 to 3 hours.

Once the neutralization is complete, the mixer/agitator is turned off and the precipitate of aluminum hydroxide is allowed to settle out of solution. The precipitate typically settles out at a rate of about 3.5 inches per hour to about 20 inches per hour (settling rate) over a period of about 5 to 36 hours. In one embodiment, the settling rate is about 10 to 18 inches per hour in about 5 to 10 hours. In another embodiment, the settling rate is about 12 inches per hour to about 16 inches per hour in about 6 to 9 hours. Overall, typically, the precipitate settles out over a period of about 5 to 36 hours. In another embodiment, the precipitate typically settles out over a period of between about 10 to about 16 hours.

For shorter settling times a flocculant or settling aid can be added. Suitable flocculants or settling aids include, but are not limited to, high molecular weight cationic, non-ionic or anionic polyacrylamide emulsion or dry polymers. Additionally, maintaining the temperature of the reaction vessel, i.e., of the slurry, at about 40° C. to about 60° C. during the settling phase of the process increases the settling rate of the precipitate, in particular, when the pH is between 4.5 and 7.5, as shown in Example 11 below.

After the precipitate has settled out of solution, a portion of the supernatant liquid is removed, typically from the top of the reaction vessel to avoid dispersing the precipitate into the supernatant. The supernatant liquid is removed by pumping, draining, or any other method known to one of skill in the art to remove it from the reaction vessel. When making PACS, enough of the supernatant liquid is removed to leave a remainder of supernatant liquid containing a desired amount of sulfate for the final PACS product. After an amount of supernatant liquid is removed, any remaining supernatant liquid and precipitate are referred to as a slurry. In one embodiment, substantially all of the supernatant liquid above the slurry is removed. Substantially all the supernatant liquid is about 90% of the total volume of the supernatant liquid above the slurry, or more preferably about 99% of the total volume of the supernatant liquid above the slurry. The amount of sulfate for the final product is preferably about 3% to about 6% w/w, or more preferably about 3.7% to about 5.7% w/w.

The precipitate and remaining supernatant liquid remain in the reaction vessel and the mixer/agitator is once again turned on to disperse the precipitate, resulting in a milky white appearance to the liquid. Next, under ambient conditions, an aqueous low to mid-basicity polyaluminum chloride (PAC) is added to the dispersed precipitate to bring the precipitate back into solution and thereby make an aqueous PACS or a PAC depending upon the presence of sulfate. In another embodiment, rather than a PAC, an aluminum chloride solution is used to bring the precipitate back into solution and thereby make an aqueous PACS or PAC. Without being bound by theory, there are many different ways to bring a precipitate back into solution, which may be referred to as dissolving the precipitate. Most of these involve chemical reactions which compete with precipitate formation. In one embodiment, it is a mid-basicity PAC that is added to the dispersed precipitate to bring the precipitate back into solution and to form the aqueous PACS or PAC. In another embodiment, hydrochloric acid of about 30-32% w/w HCl is added to the dispersed precipitate to bring the precipitate back into solution and to make the final aqueous PACS or PAC.

When a PAC is used to dissolve the precipitate, the PAC may be purchased from a supplier or manufactured as part of the disclosed method. If it is manufactured, in one embodiment, the method includes reacting, in a separate reaction vessel, hydrochloric acid under pressure with aluminum trihydrate under conditions that are well known to one of skill in the art, including under a pressure of about 60 to about 100 psi at an elevated temperature. In another embodiment, the PAC is made by reacting aluminum metal with an aluminum chloride solution under conditions known to one of skill in the art. The PAC may include about 10 to about 18% w/w alumina and a basicity of about 20 to about 45%. In one embodiment, the PAC is a mid-basicity polyaluminum chloride having about 16.5 to about 17.5% w/w alumina and a basicity of about 40-44%. In another embodiment, the PAC is a mid-basicity polyaluminum chloride having about 15% w/w alumina and a basicity of about 40-44%. In another embodiment, the mid-basicity polyaluminum chloride has about 17% w/w alumina and a basicity of about 40-44%, and more preferably around the middle of said range of basicity.

In order to dissolve the precipitate more rapidly the solution can be heated to between 120° F. (49° C.) and 160° F. (71° C.), more preferably between 140° F. (60° C.) and 150° F. (65° C.) and mixed with conventional agitation until it is dissolved, the final product is complete and will be a yellowish to beige clear liquid. The final product may be pumped from the reaction vessel using a pump, such as a centrifugal, progressive cavity, or positive displacement pump, to a storage tank. Optionally, the final product is polish filtered. The filter is preferably a 10-25 µm filter, but is not limited thereto.

The amount of aqueous low to mid-basicity polyaluminum chloride, aluminum chloride, hydrochloric acid, or combinations thereof added to the dispersed precipitate depends on the basicity desired for the final PACS or PAC. Enough aqueous low to mid-basicity polyaluminum chloride, aluminum chloride, hydrochloric acid, or combinations thereof are added in a preferred embodiment to reduce the basicity of the final PACS or PAC product to 70% w/w or lower. When the basicity is at or below 70% w/w, gel formation is prevented. In one embodiment, the aqueous low to mid-basicity polyaluminum chloride, aluminum chloride, hydrochloric acid, or combinations thereof were added to reduce the basicity to between 64% and 69% w/w. In one embodiment, the aqueous low- to mid-basicity polyaluminum chloride, aluminum chloride, hydrochloric acid, or combinations thereof were added to reduce the basicity to about 40-60% w/w. If aqueous aluminum chloride is used rather than a low- to mid-basicity PAC to disperse the precipitate, the aluminum chloride may contain about 2% to about 10% w/w alumina. In another embodiment the aqueous aluminum chloride has about 10% w/w alumina.

The final PACS product, in one embodiment, has about 10% to about 16% w/w alumina and an amount of sulfate and a basicity within the values discussed above, which may be about 4-6% w/w sulfate and a basicity of 40-70%. In one embodiment, the final PACS product has about 16-18% w/w alumina, about 4-6% w/w sulfate and a basicity of 40-60%. In another embodiment, the final PACS product has about 10-11% w/w alumina, about 4.5-5.5% w/w sulfate and a basicity of 65-69%. In another embodiment, the final PACS product has about 12-13% w/w alumina, about 3.5-4.5% w/w sulfate and a basicity of 64-68%. In another embodiment, the final PACS product has about 14-16% w/w alumina, about 4-6% w/w sulfate and a basicity of about 40-60%.

The final PAC product, in one embodiment, has about 10% to about 16% w/w alumina and an amount of basicity within the values discussed above, which may be about 40-70%. In one embodiment, the final PAC product has about 16-18% w/w alumina and a basicity of 40-60%. In another embodiment, the final PAC product has about 10-11% w/w alumina a basicity of 65-69%. In another embodiment, the final PAC product has about 12-13% w/w alumina a basicity of 64-68%. In another embodiment, the final PAC product has about 14-16% w/w alumina and a basicity of about 40-60%.

In any of the embodiments disclosed herein, the PAC or PACS products contain 20% to 60% solids as estimated from the % alumina contents, the empirical formulas and residual salts present and the balance is water. The addition of dilution water can be used to lower the % solids as desired.

In another embodiment, to tailor the content of the final PACS product, the addition of a PAC, aluminum chloride, hydrochloric acid, or a combination thereof to the dispersed precipitate includes further addition of aluminum chloride, polyaluminum chloride, aluminum chlorohydrate (which is a high basicity compound), or combinations thereof in a dry or aqueous state simultaneously therewith or subsequent thereto to adjust the basicity of the final product up or down as desired.

In a variation of the method disclosed above, rather than retaining a portion of the supernatant liquid, the precipitate is separated from the supernatant liquid by filtration to form a cake or dry powder. Thereafter, the precipitate is brought back into solution according to any one of the options disclosed above. Using this method, the final product may not include sulfates, i.e., a PAC is made from the method, and the basicity may be greater than 70%.

In another variation the excess salt is removed from the precipitated aluminum hydroxide by washing, multiple decantation or other methods of removing the supernatant liquid and any unwanted residue therefrom known to one skilled in the art and used to produce a final PACS or a PAC with basicity as high as 83% and up to 23% w/w alumina.

EXAMPLES FOR PACS

Example 1

157.7 grams of sodium carbonate was dissolved in 530.5 grams of water and transferred to a 500 ml separatory funnel. 520.3 grams of aqueous aluminum sulfate solution containing 8.05% w/w alumina ($Al_2O_3$) was placed into a separate 500 ml separatory funnel. The sodium carbonate solution and the aluminum sulfate solution were combined by slowly adding each to a 2000 ml beaker while maintaining a pH of 6.0-6.5. The resulting slurry was allowed to settle for about 16 hours. Using a peristaltic pump 767.8 grams of clear supernatant was removed from the 2000 ml beaker. The 2000 ml beaker with the remaining settled slurry was weighed and found to contain 388.7 grams of slurry. Based on the above numbers it was determined that 52.0 grams of carbon dioxide was released. The slurry was agitated to disperse the solids uniformly with a lab magnetic stirrer and Teflon coated magnetic stir bar. 425.9 grams of polyaluminum chloride containing 16.9% w/w $Al_2O_3$ and 42.7% basicity was added to the slurry. This was allowed to mix for 1 to 2 hours until all the solids were brought back into solution. The resulting polyaluminum chlorosulfate solution contained 10.8% w/w $Al_2O_3$ and 3.8% w/w sulfates ($SO_4^{-2}$) and had a 70.1% basicity.

Example 2

149.4 grams of sodium carbonate was dissolved in 500.3 grams of water and transferred to a 500 ml separatory funnel. 537.7 grams of aqueous aluminum sulfate solution containing 8.05% w/w $Al_2O_3$ was placed in a separate 500 ml separatory funnel. The sodium carbonate solution and the aluminum sulfate solution were slowly combined into a 2000 ml beaker containing 100.0 grams of water while maintaining a pH of 6.0-6.5. The resulting slurry was allowed to settle for about 16 hours. Using a peristaltic pump 704.8 grams of clear supernatant was removed from the 2000 ml beaker. The 2000 ml beaker with the remaining settled slurry was weighed and found to contain 529.2 grams of slurry. Based on the above numbers it was determined that 52.9 grams of carbon dioxide was released. The slurry was agitated to disperse the solids uniformly with a lab magnetic stirrer and Teflon coated magnetic stir bar. 460.3 grams of polyaluminum chloride containing 16.9% w/w $Al_2O_3$ and 42.7% basicity was added to the slurry. This was allowed to mix for 1 to 2 hours until all the solids had dissolved. The resulting polyaluminum chlorosulfate solution contained 11.4% w/w $Al_2O_3$ and 5.0% w/w $SO_4^{-2}$ and had a 67.0% basicity.

Example 3

37.6 grams of sodium carbonate was dissolved in 125.8 grams of water and transferred to a 500 ml separatory funnel. 135.2 grams of aqueous aluminum sulfate solution containing 8.05% w/w $Al_2O_3$ was placed into a separate 500 ml separatory funnel. The sodium carbonate solution and the aluminum sulfate solution were slowly combined into a 1000 ml beaker containing 25.0 grams of water while maintaining a pH of 6.0-6.5. The resulting slurry was allowed to settle for about 16 hours. Using a peristaltic pump 704.8 grams of clear supernatant was removed from the 2000 ml beaker. The 1000 ml beaker with the remaining settled slurry was weighed and found to contain 311.5 grams of slurry. Based on the above numbers it was determined that 12.1 grams of carbon dioxide was released. The slurry was agitated to disperse the solids uniformly with a lab magnetic stirrer and Teflon coated magnetic stir bar. 141.5 grams of polyaluminum chloride containing 16.7% w/w $Al_2O_3$ and 42.0% basicity was added to the slurry. This was allowed to mix for 1 to 2 hours until all the solids had dissolved. The resulting polyaluminum chlorosulfate solution contained 12.6% w/w $Al_2O_3$ and 4.8% w/w $SO_4^{-2}$ and had a 64.7% basicity.

Example 4

103.7 grams of sodium carbonate was dissolved in 353.3 grams of water and transferred to a 500 ml separatory funnel. 412.9 grams of aqueous aluminum sulfate solution containing 8.05% w/w $Al_2O_3$ was placed in a separate 500 ml separatory funnel. The sodium carbonate solution and the aluminum sulfate solution were slowly combined together into a 2000 ml beaker while maintaining a pH of 6.0-6.2. The resulting slurry was allowed to settle for about 16 hours. Using a peristaltic pump 544.4 grams of clear supernatant was removed from the 2000 ml beaker. The slurry was agitated to disperse the solids uniformly with a lab magnetic stirrer and Teflon coated magnetic stir bar. 424.5 grams of polyaluminum chloride containing 16.9% w/w $Al_2O_3$ and 42.7% basicity was added to the slurry. This was allowed to mix for 1 to 2 hours until all the solids had dissolved. The resulting polyaluminum chlorosulfate solution contained 15.0% w/w $Al_2O_3$ and 4.9% w/w $SO_4^{-2}$ and had a 62.6% basicity.

Example 5

122.4 grams of sodium carbonate was dissolved in 489.8 grams of water and transferred to a 500 ml separatory funnel. 400.0 grams of polyaluminum chloride containing 18.5% w/w $Al_2O_3$ and 47% basicity was placed into a separate 500 ml separatory funnel. The sodium carbonate solution and the polyaluminum chloride solution were slowly combined into a 4000 ml beaker containing 2753.8 grams of water while maintaining a pH of 5.0-7.0. The resulting slurry was filtered through a #41 Whatman filter paper to form a cake. The cake was re-dispersed in 3000 grams of fresh water and then filtered through another #41 Whatman filter paper to form a washed cake. Then 300.0 grams of the washed precipitated aluminum hydroxide cake was slowly added to 213.6 grams of polyaluminum chloride containing 18.5% w/w $Al_2O_3$ and 47% basicity and allowed to mix for 1 to 2 hours until all the solids had dissolved. The resulting polyaluminum chloride solution contained 14.4% w/w $Al_2O_3$ and has a 72.5% basicity.

Example 6

57.9 grams of sodium carbonate was dissolved in 193.2 grams of water and transferred to a 500 ml separatory funnel. 208.4 grams of aqueous aluminum sulfate solution containing 8.28% w/w alumina ($Al_2O_3$) was placed in a separate 500 ml separatory funnel. The sodium carbonate solution and the aluminum sulfate solution were combined by slowly adding each to a 2000 ml beaker while maintaining a pH of 6.0-7.0. The resulting slurry was allowed to settle for about 16 hours. Using a peristaltic pump 149.9 grams of clear supernatant was removed from the 2000 ml beaker. The 2000 ml beaker with the remaining settled slurry was weighed and found to contain 287.3 grams of slurry. Based on the numbers above it was determined that 22.3 grams of carbon dioxide was released. The slurry was agitated to disperse the solids uniformly with a lab magnetic stirrer and Teflon coated magnetic stir bar. 211.7 grams of polyaluminum chloride containing 16.9% w/w $Al_2O_3$ and 43.7% basicity was added to the slurry. This was allowed to mix for 1 to 2 hours until all the solids had dissolved. The resulting polyaluminum chlorosulfate solution contained 11.2% w/w $Al_2O_3$ and 6.7% w/w $SO_4^{-2}$ and had a 69.5% basicity.

Example 7

250 pounds of sodium carbonate were dissolved in 834 pounds grams of water in a 275 gallon tote bin fitted with an agitator. 900 pounds of aqueous aluminum sulfate solution containing ~8.15% w/w alumina ($Al_2O_3$) was placed in a separate 275 gallon tote bin. The sodium carbonate solution and the aluminum sulfate solution were combined slowly using chemical feed pumps to introduce both into a third 275 gallon tote bin while maintaining a pH of 6.0-7.0. The resulting slurry was allowed to settle for about 16 hours. After settling 125 gallons of clear supernatant was removed from the tote bin. The slurry was agitated to disperse the solids uniformly and 941 pounds of polyaluminum chloride containing 17% w/w $Al_2O_3$ and 42% basicity was added to the slurry. This was allowed to mix for 1 to 2 hours until all the solids had dissolved. The resulting polyaluminum chlorosulfate solution contained 10.2% w/w $Al_2O_3$ and 4.3% w/w $SO_4^{-2}$ and had a 67.3% basicity.

Example 8

39.9 grams of sodium aluminate containing 18.4% w/w disodium oxide ($Na_2O$) and 20.1% w/w alumina ($Al_2O_3$) was added to a 500 ml separatory funnel. 69.7 grams of aqueous aluminum sulfate solution containing 8.17% w/w alumina ($Al_2O_3$) was placed into a 250 ml beaker. 366.2 grams of water was placed in a separate 1000 ml beaker. A conventional overhead lab mixer was used to agitate the water. The pH was measured by clamping a calibrated pH probe into the water. The sodium aluminate and the aluminum sulfate solution were combined by slowly adding each to a 1000 ml beaker while maintaining a pH of 6.5-7.5. The sodium aluminate was added drop wise to the surface of the water. The aluminum sulfate solution was added slowly near the bottom of the beaker through a glass tube using a peristaltic pump. The resulting slurry was allowed to settle for about 16 hours. Using a peristaltic pump 155.9 grams of clear supernatant was removed from the 1000 ml beaker. The 2000 ml beaker with the remaining settled slurry was weighed and found to contain 314.2 grams of slurry. About 5.7 grams were lost through evaporation. The slurry was agitated to disperse the solids uniformly with the overhead lab mixer. 149.4 grams of polyaluminum chloride containing 16.9% w/w alumina ($Al_2O_3$) and 42.7% basicity was added to the slurry. This was allowed to mix for 48 to 72 hours until all the solids were brought back into solution. The resulting polyaluminum chlorosulfate solution contained 8.5% w/w alumina ($Al_2O_3$) and about 2% w/w sulfates ($SO_4^{-2}$) and a 62.3% basicity.

Example 9

40.4 grams of sodium aluminate containing 18.4% w/w disodium oxide ($Na_2O$) and 20.1% w/w alumina ($Al_2O_3$) was added to a 500 ml separatory funnel. 70.1 grams of aqueous aluminum sulfate solution containing 8.17% w/w alumina ($Al_2O_3$) was placed into a 250 ml beaker. 366.2 grams of water was placed in a separate 1000 ml beaker. A conventional overhead lab mixer was used to agitate the water. The pH was measured by clamping a calibrated pH probe into the water. The sodium aluminate and the aluminum sulfate solution were combined by slowly adding each to a 1000 ml beaker while maintaining a pH of 6.5-7.5. The sodium aluminate was added drop wise to the surface of the water. The aluminum sulfate solution was added slowly near the bottom of the beaker through a glass tube using a peristaltic pump. The resulting slurry was allowed to settle for about 16 hours. Using a peristaltic pump 214.0 grams of clear supernatant was removed from the 2000 ml beaker. The 1000 ml beaker with the remaining settled slurry was weighed and found to contain 255.6 grams of slurry. About 7.1 grams were lost through evaporation. The slurry was agitated to disperse the solids uniformly with the overhead lab mixer. 124.5 grams of polyaluminum chloride containing 16.9% w/w alumina ($Al_2O_3$) and 42.7% basicity was added to the slurry. This was allowed to mix for 48 to 72 hours until all the solids were brought back into solution. The resulting polyaluminum chlorosulfate solution contained 9.5% w/w alumina ($Al_2O_3$) and 3.0% w/w sulfates ($SO_4^{-2}$) and a 63.9% basicity.

Example 10

103.0 grams of sodium aluminate containing 18.4% w/w disodium oxide ($Na_2O$) and 20.1% w/w alumina ($Al_2O_3$) was added to a 500 ml separatory funnel. 206.0 grams of water was also added to the separatory funnel. The funnel was capped and inverted several times to mix the solution. 180.9 grams of aqueous aluminum sulfate solution containing 8.28% w/w alumina ($Al_2O_3$) was placed into a 250 ml beaker. 524.0 grams of water was placed in a separate 2000 ml beaker. A conventional overhead lab mixer was used to agitate the water. The pH was measured by clamping a calibrated pH probe into the water. The diluted sodium aluminate solution and the aluminum sulfate solution were combined by slowly adding each to a 2000 ml beaker while maintaining a pH of 6.8-72. The sodium aluminate was added drop wise to the surface of the water. The aluminum sulfate solution was added slowly near the bottom of the beaker through a glass tube using a peristaltic pump. The resulting slurry was allowed to settle for about 16 hours. Using a peristaltic pump 598.1 grams of clear supernatant was removed from the 2000 ml beaker. The 2000 ml beaker with the remaining settled slurry was weighed and found to contain 381.3 grams of slurry. About 34.5 grams were lost through evaporation and sampling. The slurry was agitated to disperse the solids uniformly with the overhead lab mixer. 280.0 grams of polyaluminum chloride containing 16.9% w/w alumina ($Al_2O_3$) and 42.7% basicity was added to the slurry. This was allowed to mix for 48 to 72 hours until all the solids were brought back into solution. The resulting polyaluminum chlorosulfate solution contained 12.4% w/w alumina ($Al_2O_3$) and 3.5% w/w sulfates ($SO_4^{-2}$) and a 64.6% basicity.

Example 11

292.5 grams of sodium carbonate were dissolved in 911.5 grams of water in a 1000 ml beaker. 984.0 grams of aqueous aluminum sulfate solution containing ~8.15% w/w alumina ($Al_2O_3$) was placed in a separate 1000 ml beaker. 337.9 grams of water was added to a 2000 ml beaker. An overhead lab mixer with a pitched four blade impeller was set to a height so that the impeller was just submerged by the water. The speed of the mixer was set to achieve sufficient agitation to disperse the reactants but not so high as to splash the liquid or cause excessive shearing of the precipitate. The sodium carbonate solution and the aluminum sulfate solutions were injected close to the impeller on opposite sides just under the surface of the initial water. They were fed slowly into the water using adjustable peristaltic chemical feed pumps at a rate of 7.6 ml per minute to maintain the pH in the range of 5.1-5.3. After the first run the experiment was repeated several times at varying pH and temperature ranges. The pH range was adjusted by varying the feed rates of the peristaltic pumps. The temperature was elevated by heating the initial water to 50° C. on a hotplate. In addition the sodium carbonate solution was heated to 72° C. and the aluminum sulfate solution to 30° C. using temperature controlled hotplates. As the neutralization/precipitation reaction proceeded the temperature of the slurry began to fall and adjustment was made by increasing the hotplate temperature setting under the 2000 ml beaker to maintain the temperature around 45° C. The results are tabulated below.

| Run number | Neutralization Temperature (° C.) | Neutralization pH range | Settling rate (inches/hour) | Settled volume solids (ml) | Total volume (ml) | Settled volume solids (%) |
|---|---|---|---|---|---|---|
| 1 | 20-25 | 5.1-5.3 | ND | 1130 | 2100 | 54 |
| 2 | 43-50 | 5.1-5.3 | 13.5 | 600 | 2000 | 30 |
| 3 | 44-52 | 5.9-6.3 | 0.5 | ND | ND | ND |
| 4 | 43-50 | 5.1-5.3 | 11.3 | 550 | 1990 | 28 |
| 5 | 42-47 | 5.5-5.7 | 9.0 | 600 | 1920 | 31 |

ND = not determined

Example 12

Pre-Phase #1 Procedure (1) Approximately 2,100 gallons of hot water (at least at 40° C. to about 60° C.) are initially added to a 15,800 gallon reactor having an inner diameter of about 13 ft and wall height of about 14 ft.

(2) 4,600 gallons of aluminum sulfate are provided in a holding tank.

(3) Approximately 47,250 lbs of hot water (at least at 40° C. to about 60° C.) is fed to a soda ash mix tank along with 15,160 lbs of dry soda ash powder. The total weight of 62,410 lbs of soda ash solution is equal to approximately 6,064 gallons. After water and soda ash addition is complete, the solution is mixed for a minimum of 90 minutes or until the soda ash is dissolved.

(4) To insure accuracy and consistent pH measurement throughout phase #1, the pH meter was calibrated.

Phase #1

In the 15,800 gallon reactor, an agitator, a Sharpe Mixer 30N8-25 having two hydrofoil impellers on a 218 inch long shaft, was centered therein (with the impellers at about 168 inches from the top of the tank) and turned to 80% of full speed (full speed=71 rpm) to allow the hot water from the pre-phase #1 procedure to begin mixing. Valves were opened so that aluminum sulfate and soda ash were fed into the reactor. The soda ash flow rate was set at 50.0 gallons gpm. The alum feed was based on a flow rate of "% excess alum" being 2% above the soda ash feed rate, i.e., 2% above 50.0 gpm is 51.0 gpm. The starting pH was in a 3.2-4.0 range and slowly rose to a 5.2-5.7 pH range by the end of the alum feed, which was completed in approximately 90 minutes for the 4,600 gallons in the holding tank. The soda ash continued to feed thereafter until all 62,410 lbs of soda ash was added to the reactor. When the soda ash feed was complete, approximately 800 lbs of hot water was fed into the reactor; this was used to flush the soda ash line. The agitator continued to mix the components in the reactor for an additional 30 minutes at the same rpm to assure a homogeneous solution. The agitator was then turned off and the precipitate formed by the reaction was allowed to settle. After the precipitate settled, a selected amount of the clear sodium sulfate solution was removed from the top of the reactor (so as not to disturb the precipitate) depending upon the desired properties of the end product.

Phase #2

After the sodium sulfate solution was removed from the reactor, the agitator was turned "on" to 100% of full speed to mix the precipitate with the remaining solution for a minimum of 15 minutes prior to the addition of a mid-basicity polyaluminum chloride solution. The mid-basicity polyaluminum chloride solution added in this Example had an alumina content of about 16.7-17.5%, a chloride content of about 19.5-21.9%, a basicity of about 40-44%, a specific gravity of about 1.34 to 1.40 at 60° F., and a turbidity of less than about 50 NTU. Approximately 4,500 gallons of this mid-basicity polyaluminum chloride solution was added to the reactor over a 25-30 minute period with a feed rate of approximately 180 gallons per minute. After this addition was complete, the final solution was mixed for at least 60 minutes before the end product was moved to a holding tank for storage or to individual shipping containers.

One of the advantages of this process is that the end product can be tailored to have specific characteristics based on the amount of the clear sodium sulfate solution removed from the top of the reactor. To obtain one end product, a polyaluminum chlorosulfate solution having 12.9% w/w $Al_2O_3$, 4.3% w/w $SO_4^{-2}$, and a 65% basicity, 8,440 gallons of clear sodium sulfate solution was removed from the top of the reactor. To obtain another end product, a polyaluminum chlorosulfate solution having 10.8% w/w $Al_2O_3$, 5.3% w/w $SO_4^{-2}$, and a 67% basicity, 6,786 gallons of clear sodium sulfate solution was removed from the top of the reactor. While these two specific examples of end products are provided, many more are possible.

Example 13

The pre-phase #1 procedures of Example 8 were followed.

Phase #1

In the 15,800 gallon reactor, an agitator, a Sharpe Mixer 30N8-25 having two hydrofoil impellers on a 218 inch long shaft, was centered therein (with the impellers at about 168 inches from the top of the tank) and turned to 80% of full speed (full speed=71 rpm) to allow the hot water from the pre-phase #1 procedure to begin mixing. Valves were opened so that aluminum sulfate and soda ash were fed into the reactor. The soda ash flow rate was set at 40 gpm. The alum feed was based on a flow rate of "% excess alum" being 3% above the soda ash feed rate, i.e., 3% above 40 gpm is 41.2 gpm. The starting pH was in a 3.2-4.0 range and slowly rose to a 5.2-5.7 pH range by the end of the alum feed for the 4600 gallons in the holding tank. The soda ash continued to feed thereafter until all 62,410 lbs of soda ash was added to the reactor. When the soda ash feed was complete, approximately 800 lbs of hot water was fed into the reactor; this was used to flush the soda ash line. The agitator continued to mix the components in the reactor for an additional 30 minutes at the same rpm to assure a homogeneous solution. The agitator was then turned off and the precipitate formed by the reaction was allowed to settle. After the precipitate settled, a selected amount of the clear sodium sulfate solution was removed from the top of the reactor (so as not to disturb the precipitate) depending upon the desired properties of the end product.

Phase #2

Phase #2 was completed according to Example 8 to arrive at an end product. The same example amounts of gallons of clear sodium sulfate solution were removed from the top of the reactor to arrive at the polyaluminum chlorosulfate solutions of this Example 9.

Example 14

The pre-phase #1 procedures of Example 8 were followed.

Phase #1

In the 15,800 gallon reactor, an agitator, a Sharpe Mixer 30N8-25 having two hydrofoil impellers on a 218 inch long shaft, was centered therein (with the impellers at about 168 inches from the top of the tank) and turned to 80% of full speed (full speed=71 rpm) to allow the hot water from the pre-phase #1 procedure to begin mixing. Valves were opened so that aluminum sulfate and soda ash were fed into the reactor. The soda ash flow rate was set at 60 gallons per minute (gpm). The alum feed was based on a flow rate of "% excess alum" being 4% above the soda ash feed rate, i.e., 4% above 60 gpm is 62.4 gpm. The starting pH was in a 3.2-4.0 range and slowly rose to a 5.2-5.7 pH range by the end of the alum feed for the 4600 gallons in the holding tank. The soda ash continued to feed thereafter until all 62,410 lbs of soda ash was added to the reactor. When the soda ash feed was complete, approximately 800 lbs of hot water was fed into the reactor; this is used to flush the soda ash line. The agitator continued to mix the components in the reactor for an additional 30 minutes at the same rpm to assure a homogeneous solution. The agitator was then turned off and the precipitate formed by the reaction was allowed to settle. After the precipitate settled, a selected amount of the clear sodium sulfate solution was removed from the top of the reactor (so as not to disturb the precipitate) depending upon the desired properties of the end product.

Phase #2

Phase #2 was completed according to Example 8 to arrive at an end product. The same example amounts of gallons of clear sodium sulfate solution were removed from the top of the reactor to arrive at the polyaluminum chlorosulfate solutions of this Example 10.

Example 15

To a portion of the end product, a polyaluminum chlorosulfate solution having 12.9% w/w $Al_2O_3$, 4.3% w/w $SO_4^{-2}$, and a 65% basicity, made as in Example 8, an additional amount of the mid-basicity polyaluminum chloride solution was added using conventional agitation and mixing to obtain a different end product, a polyaluminum chlorosulfate solution having 13.2-16.7% w/w $Al_2O_3$, 0.4-3.8% w/w $SO_4^{-2}$, and a 44-64% basicity, depending on the amount of additional mid-basicity polyaluminum chloride added. The amount of the end product from Example 8 as described in this paragraph is referred to as Example 8A in the table below:

| % w/w Example 8A | % w/w additional mid-basicity PAC | % w/w $Al_2O_3$ | % w/w $SO_4^{-2}$ | % Basicity |
|---|---|---|---|---|
| 90.0 | 10.0 | 13.2 | 3.8 | 64 |
| 80.0 | 20.0 | 13.7 | 3.4 | 61 |
| 70.0 | 30.0 | 14.1 | 2.9 | 58 |
| 60.0 | 40.0 | 14.5 | 2.5 | 55 |
| 50.0 | 50.0 | 15.0 | 2.1 | 53 |
| 40.0 | 60.0 | 15.4 | 1.7 | 50 |
| 30.0 | 70.0 | 15.8 | 1.3 | 48 |
| 20.0 | 80.0 | 16.2 | 0.8 | 46 |
| 10.0 | 90.0 | 16.7 | 0.4 | 44 |

Example 16

To a portion of the end product, a polyaluminum chlorosulfate solution having 10.8% w/w $Al_2O_3$, 5.3% w/w $SO_4^{-2}$ and a 67% basicity, made as in Example 8, an additional amount of the mid-basicity polyaluminum chloride solution was added using conventional agitation and mixing to obtain a different end product, a polyaluminum chlorosulfate solution having 11.4-16.5% w/w $Al_2O_3$, 0.5-4.7% w/w $SO_4^{-2}$, and a 42-63% basicity, depending on the amount of additional mid-basicity polyaluminum chloride added. Samples produced between about 48-56% basicity were not stable. The amount of the end product from Example 8 as described in this paragraph is referred to as Example 8B in the table below:

| % w/w Example 8B | % w/w additional mid-basicity PAC | % w/w $Al_2O_3$ | % w/w $SO_4^{-2}$ | % Basicity |
|---|---|---|---|---|
| 90.0 | 10.0 | 11.4 | 4.7 | 63 |
| 80.0 | 20.0 | 12.0 | 4.2 | 59 |
| 30.0 | 70.0 | 15.2 | 1.6 | 46 |
| 20.0 | 80.0 | 15.8 | 1.0 | 44 |
| 10.0 | 90.0 | 16.5 | 0.5 | 42 |

Example 17

To a portion of the end product, a polyaluminum chlorosulfate solution having 10.8% w/w $Al_2O_3$, 5.3% w/w $SO_4^{-2}$ and a 67% basicity, made as in Example 8, an additional amount of the mid-basicity polyaluminum chloride solution and water was added using conventional agitation and mixing to obtain a different end product, a polyaluminum chlorosulfate solution having 10.7% w/w $Al_2O_3$, 0.5-4.7% w/w $SO_4^{-2}$, and a 43-64% basicity, depending on the amount of additional mid-basicity polyaluminum chloride added. The amount of the end product from Example 8 as described in this paragraph is referred to as Example 8B in the table below:

| % w/w Example 8B | % w/w additional mid-basicity PAC | % w/w Water | % w/w $Al_2O_3$ | % w/w $SO_4^{-2}$ | % Basicity |
|---|---|---|---|---|---|
| 90.0 | 6.0 | 4.0 | 10.7 | 4.7 | 64 |
| 80.0 | 12.2 | 7.8 | 10.7 | 4.2 | 62 |
| 70.0 | 18.5 | 11.5 | 10.7 | 3.6 | 59 |
| 60.0 | 24.8 | 15.2 | 10.7 | 3.1 | 56 |
| 50.0 | 31.1 | 18.9 | 10.7 | 2.6 | 54 |
| 40.0 | 37.4 | 22.6 | 10.7 | 2.1 | 51 |
| 30.0 | 43.7 | 26.3 | 10.7 | 1.6 | 48 |
| 20.0 | 50.0 | 30.0 | 10.7 | 1.0 | 45 |
| 10.0 | 56.2 | 33.8 | 10.7 | 0.5 | 43 |

Example 18

To a portion of the end product, a polyaluminum chlorosulfate solution having 12.9% w/w $Al_2O_3$, 4.3% w/w $SO_4^{-2}$, and a 65% basicity, made as in Example 8, an additional amount of the high-basicity aluminum chlorohydrate solution was added using conventional agitation and mixing to obtain a different end product, a polyaluminum chlorosulfate solution having 13.9-22.4% w/w $Al_2O_3$, 0.4-3.8% w/w $SO_4^{-2}$, and a 69-82% basicity, depending on the amount of additional mid-basicity polyaluminum chloride added. The amount of the end product from Example 8 as described in this paragraph is referred to as Example 8A in the table below:

| % w/w Example 8A | % w/w additional high-basicity ACH | % w/w $Al_2O_3$ | % w/w $SO_4^{-2}$ | % Basicity |
|---|---|---|---|---|
| 90.0 | 10.0 | 13.9 | 3.8 | 69 |
| 80.0 | 20.0 | 14.9 | 3.4 | 71 |
| 70.0 | 30.0 | 16.0 | 2.9 | 74 |
| 60.0 | 40.0 | 17.1 | 2.5 | 76 |
| 50.0 | 50.0 | 18.2 | 2.1 | 77 |
| 40.0 | 60.0 | 19.2 | 1.7 | 79 |
| 30.0 | 70.0 | 20.3 | 1.3 | 80 |
| 20.0 | 80.0 | 21.4 | 0.8 | 81 |
| 10.0 | 90.0 | 22.4 | 0.4 | 82 |

EXAMPLES FOR PAC

Example 19

150.0 grams of a polyaluminum chloride containing 23.7% w/w alumina ($Al_2O_3$) and 83.6% basicity was added to a beaker. This was agitated using a magnetic stirrer and stir bar such that the solids remained homogeneously dispersed. To this 55.8 grams of aqueous of 25% w/w sodium hydroxide solution was added drop wise to the to produce an aluminum hydroxide slurry. After addition was complete 25.0 grams of water was added to thin the resulting aluminum hydroxide slurry. To about 115.2 grams of the slurry, 262.7 grams of polyaluminum chloride containing 16.3% w/w alumina ($Al_2O_3$) and 41.2% basicity was added and allowed to mix until all the aluminum hydroxide solids had dissolved. The resulting polyaluminum chloride solution contained 16.0% w/w alumina ($Al_2O_3$) and had a basicity of 60.9%.

Example 20

150.0 grams of a polyaluminum chloride containing 23.7% w/w alumina ($Al_2O_3$) and 83.6% basicity was added to a beaker. This was agitated using a magnetic stirrer and stir bar such that the solids remained homogeneously dispersed. To this 55.8 grams of aqueous of 25% w/w sodium hydroxide solution was added drop wise to the to produce an aluminum hydroxide slurry. After addition was complete 25.0 grams of water was added to thin the resulting aluminum hydroxide slurry. To about 115.2 grams of the slurry, 247.1 grams of polyaluminum chloride containing 16.3% w/w alumina ($Al_2O_3$) and 41.2% basicity was added and allowed to mix until all the aluminum hydroxide solids had dissolved. The resulting polyaluminum chloride solution contained 15.3% w/w alumina ($Al_2O_3$) and had a basicity of 71.6%.

Example 21

75.0 grams of a polyaluminum chloride containing 16.3% w/w alumina ($Al_2O_3$) and 41.2% basicity was added to a beaker. This was agitated using a magnetic stirrer and stir bar such that the solids remained homogeneously dispersed. To this 65.0 grams of aqueous of 25% w/w sodium hydroxide solution was added drop wise to the to produce an aluminum hydroxide slurry. To this 84.6 grams of additional polyaluminum chloride containing 16.3% w/w alumina ($Al_2O_3$) and 41.2% basicity was added and allowed to mix until most of the aluminum hydroxide solids had dissolved. The slurry was heated to boiling to dissolve the remaining solids. The resulting polyaluminum chloride solution contained 12.4% w/w alumina ($Al_2O_3$) and had a basicity of 74.4%.

Example 22

115.1 grams of a polyaluminum chloride containing 16.3% w/w alumina (AhO3) and 41.2% basicity was added to a beaker. This was agitated using a magnetic stirrer and stir bar such that the solids remained homogeneously dispersed. Placed 186.0 grams of water in a separate beaker and added 103.5 grams of aqueous sodium aluminate containing ~18% w/w disodium oxide ($Na2O$) and ~20% w/w alumina (AhO3) the mixture was agitated until homogeneous. This was added drop wise to the first beaker to produce an aluminum hydroxide slurry. To this 227.8 grams of additional polyaluminum chloride containing 16.3% w/w alumina (AhO3) and 41.2% basicity was added and allowed to mix until most of the aluminum hydroxide solids had dissolved. The slurry was heated to 185° P (85° C.) and 195° P (90° C.) to dissolve the remaining solids. The resulting polyaluminum chloride solution contained 16.3% w/w alumina (AhO3) and had a basicity of 72.6%.

Example 23

A sample was made as in Example 3. After the addition of the polyaluminum chloride containing 16.9% w/w alumina ($Al_2O_3$) and 42.7% basicity, the solution was heated while mixing using a hotplate to between about 140° F. (60° C.) and 150° F. (65° C.). The heated solution was allowed to mix for 3 to 4 hours until all the solids were brought back into solution. The resulting polyaluminum chlorosulfate solution contained 12.1% w/w alumina ($Al_2O_3$) and 3.6% w/w sulfates ($SO_4^{-2}$) and a 66.6% basicity.

The embodiments described above are exemplary of numerous methods that may be made within the scope of the appended claims. It is contemplated that numerous other methods and products may be created by taking advantage of the disclosed approach. For example, while some of the embodiments above refer to the use of sulfated polyaluminum chloride as flocculating agents, the products resulting from the claimed methods can be used wherever sulfated polyaluminum chloride products are presently used in industry, for example as raw materials in industrial manufacturing applications. However, the scope of the patent issuing herefrom will be limited only by the scope of the appended claims.

What is claimed is:
1. A method for making aqueous sulfated polyaluminum chloride, the method comprising:
    adding a first solution comprising an amount of a sulfate-containing aluminum compound to a reaction vessel;

adding a second solution, simultaneously with the first solution, comprising an amount of a base to the reaction vessel;

mixing the first solution and the second solution in the reaction vessel to produce a mixture as the first solution and the second solution are added to the reaction vessel until a pH between 4.5 and 10 of the mixture is attained;

once the pH of the mixture is attained between 4.5 and 10, maintaining the pH of the mixture between 4.5 and 10 during the mixing to produce an aluminum hydroxide precipitate dispersed in a liquid;

allowing the aluminum hydroxide precipitate in the mixture to settle and creating a supernatant liquid;

removing an amount of the supernatant liquid from the mixture to form a slurry;

mixing the slurry; and adding a third solution comprising a polyaluminum chloride solution having about 10% to about 18% alumina and a basicity of about 20% to about 45%, an aluminum chloride solution, and/or a hydrochloric acid solution to the slurry to dissolve the aluminum hydroxide precipitate to form the aqueous sulfated polyaluminum chloride.

2. The method of claim 1, further comprising heating the slurry to reduce the time for dissolving the aluminum hydroxide precipitate.

3. The method of claim 1, wherein at least one of aqueous alum, aqueous aluminum sulfate, or aqueous sulfated polyaluminum chloride is the source of the sulfate-containing aluminum compound, and the base is selected from the group consisting of sodium carbonate, sodium bicarbonate, sodium hydroxide, sodium aluminate, and combinations thereof.

4. The method of claim 3, wherein the base is aqueous sodium carbonate having 1% to 33% w/w sodium carbonate, is aqueous sodium hydroxide having 1% to 50% w/w sodium hydroxide or is sodium aluminate having about 20% to about 25% w/w alumina and about 18% to about 20% w/w sodium dioxide.

5. The method of claim 1, further comprising adding aluminum chloride, polyaluminum chloride, aluminum chlorohydrate, or a combination thereof in a dry or aqueous state simultaneously with or subsequent to the adding the third solution comprising the polyaluminum chloride solution to the slurry.

6. The method of claim 1, wherein the adding the third solution comprising the polyaluminum chloride solution to the slurry includes the polyaluminum chloride solution having about 16.5% to about 17.5% w/w alumina and the basicity of about 40-44%.

7. The method of claim 1, wherein the allowing the aluminum hydroxide precipitate in the mixture to settle includes waiting a period of between about 5 to about 36 hours for the aluminum hydroxide precipitate to settle.

8. The method of claim 1, wherein maintaining the pH of the mixture includes the pH having a range between 4.5 to 7.5.

9. The method of claim 1, wherein the mixing the first solution and the second solution in the reaction vessel includes maintaining the mixture at a reaction temperature at or above 40° C.

10. The method of claim 9, wherein the mixing the first solution and the second solution in the reaction vessel includes maintaining the mixture at a reaction temperature at or above 50° C.

11. The method of claim 1, wherein maintaining the pH includes controlling a first feed rate of the first solution and a second feed rate of the second solution wherein the first feed rate is greater than the second feed rate.

12. The method of claim 1, wherein maintaining the pH includes controlling a first feed rate of the first solution and a second feed rate of the second solution wherein the base comprises sodium aluminate and the first feed rate and the second feed rate are substantially equal.

13. The method of claim 3, wherein the source of the sulfate-containing aluminum compound comprises aqueous sulfated polyaluminum having about 10% to about 16% w/w alumina, about 4% to about 6% w/w sulfate, and a basicity of about 40% to about 70%.

14. The method of claim 3, wherein the source of the sulfate-containing aluminum compound comprises aqueous sulfated polyaluminum chloride having about 10% to about 11% w/w alumina, about 4.5% to about 5.5% w/w sulfate, and a basicity of about 65% to about 69%.

15. The method of claim 1, wherein the sulfate-containing aluminum compound comprises an aluminum sulfate having about 2% to about 8% w/w alumina.

16. The method of claim 1, wherein the adding the third solution comprising an aluminum chloride solution to the slurry includes aqueous aluminum chloride having about 2% to about 10% w/w alumina.

17. The method of claim 1, wherein maintaining the pH of the mixture includes the pH having a range from 5.0 to 7.0.

18. The method of claim 1, wherein maintaining the pH of the mixture includes the pH having a range from 6.0 to 6.5.

19. The method of claim 1, wherein maintaining the pH of the mixture includes the pH having a range from about 6.5 to about 7.5.

20. The method of claim 1, wherein maintaining the pH of the mixture includes the pH having a range from about 6.8 to about 7.2.

* * * * *